United States Patent [19]

Toyama

[11] Patent Number: 4,550,995

[45] Date of Patent: Nov. 5, 1985

[54] AUTOMATIC FOCUS ADJUSTING DEVICE

[75] Inventor: Masamichi Toyama, Tokyo, Japan

[73] Assignee: Canon Kabushiki Kaisha, Tokyo, Japan

[21] Appl. No.: 675,336

[22] Filed: Nov. 27, 1984

[30] Foreign Application Priority Data

Dec. 2, 1983 [JP] Japan ................. 58-228682

[51] Int. Cl.4 .................. G03B 3/00; H04N 5/38
[52] U.S. Cl. ................... 354/403; 358/227
[58] Field of Search .............. 354/400–409, 354/430; 352/140; 358/227

[56] References Cited

U.S. PATENT DOCUMENTS

| 3,399,307 | 8/1968 | Levin | 354/430 |
| 4,344,024 | 8/1982 | Cocron | 354/403 X |
| 4,347,590 | 8/1982 | Heger et al. | 354/401 X |
| 4,392,726 | 7/1983 | Kimura | 354/402 |
| 4,422,097 | 12/1983 | Inuiya | 354/402 X |
| 4,503,325 | 3/1985 | Araki | 354/402 X |

Primary Examiner—William B. Perkey
Attorney, Agent, or Firm—Toren, McGeady, Stanger, Goldberg & Kiel

[57] ABSTRACT

The disclosed automatic focus adjusting device is of the active type whose focusing apparatus becomes operative either when an image of an object goes out of focus, or when the object image has started to move. In one embodiment, a first detecting circuit receptive of index signals reflected from the object detects when the object becomes out of focus based on the high frequency component of the index signal. A second detecting circuit also receptive of index signals reflected from the object detects when the object has moved. An automatic focus control circuit reinstitutes the focusing operation in response to either or both of the detecting circuits. Accordingly, an in-focus object is kept in-focus despite changes in object brightness or movement.

4 Claims, 15 Drawing Figures

FIG.3A  VERTICAL SYNCHRONIZING SIGNAL

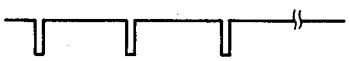

FIG.3B  HORIZONTAL SYNCHRONIZING SIGNAL

FIG.3C  OUTPUT SIGNAL OF HIGH PASS FILTER 22

FIG.3D  OUTPUT SIGNAL OF INTEGRATION CKT 23

FIG.3E  OUTPUT SIGNAL OF SAMPLE AND HOLD CKT 24

FIG.3F  OUTPUT SIGNAL OF LATCH CKT 25

FIG.3G  OUTPUT SIGNAL OF COMPARATOR 26

FIG.3H  INPUT SIGNAL TO INTEGRATION CKT 32

FIG.3I  OUTPUT SIGNAL OF INTEGRATION CKT 32

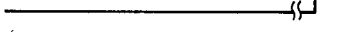

FIG.3J  OUTPUT SIGNAL OF SAMPLE AND HOLD CKT 33

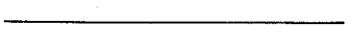

FIG.3K  OUTPUT SIGNAL OF LATCH CKT 34

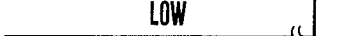

FIG.3L  OUTPUT SIGNAL OF COMPARATOR 35

FIG.3M  OUTPUT SIGNAL OF OR CKT 41

AUTOMATIC FOCUS ADJUSTING DEVICE

BACKGROUND OF THE INVENTION

1. Field of the Invention

This invention relates to automatic focus adjusting devices, and more particularly to active type automatic focus adjusting devices for automatically focusing an optical system by projecting a signal onto an object and detecting the reflection of the signal therefrom.

2. Description of the Prior Art

The present inventor and others have previously proposed an automatic focus adjusting device for video cameras. The video camera is equipped with an active type automatic focusing mechanism using a light source in the form of a near infrared light emitting diode. This invention is disclosed in U.S. patent application Ser. No. 536,369 (corresponding to Japanese patent application No. SHO 57-171923). The device utilizes the fact that the high frequency component of a video signal is capable of reaching a peak when the object image is in focus. After the focus adjusting operation of the active type automatic focusing mechanism has been completed, the variation of the high frequency component of the video signals is monitored to determine whether the image for the subsequent frame is in focus or out of focus. If the image has gone out of focus, the active type automatic focusing mechanism is again rendered operative to re-apply the focus adjusting operation. The use of this device provides the possibility of re-establishing an in-focus condition even when the object has moved after an initial focus adjustment, as soon as the image becomes out of focus. Additionally, it makes it unnecessary to continue energization of the light emitting diode after the image is in focus. This reduces wasteful consumption of electrical power.

However, in this device, after the image for the first field has been focused, determination of whether the image for the second field is in focus or out of focus is made based only on the value of the high frequency component of the video signal. This results in a drawback. The latter occurs, for example, as the camera is panning, and detects another object image. The detection during panning increases the high frequency component of the video signal. Accordingly, despite the fact that the actual image is out of focus, the system perceives it to be in focus. This rendering it impossible to perform an accurate automatic focus adjustment.

SUMMARY OF THE INVENTION

With the foregoing in mind, it is an object of the present invention to provide an automatic focusing apparatus which is always able to perform reliable and accurate focus adjustment while minimizing the consumption of electrical power.

The present invention is applied to an active type automatic focusing apparatus which projects a signal onto an object and senses the reflection of the signal from the object to adjust an optical system to focus, and, which stops its operation after the focus adjustment of said optical system has been completed. A feature is that the automatic focus adjusting device is provided with a first detecting circuit receptive of video signals of said object for detecting the fact that an image of said object has become out of focus, and a second detecting circuit receptive of video signals of said object for detecting the fact that an image of said object has moved, whereby responsive to at least either one of the detection outputs of said first and said second detecting circuits, the automatic focus adjusting device starts operation of said active type focusing apparatus again.

BRIEF DESCRIPTION OF THE DRAWINGS

FIGS. 3A to 3M are wave forms of the main outputs of the device shown in FIG. 1.

DETAILED DESCRIPTION OF THE PREFERRED EMBODIMENT

Figure 1:
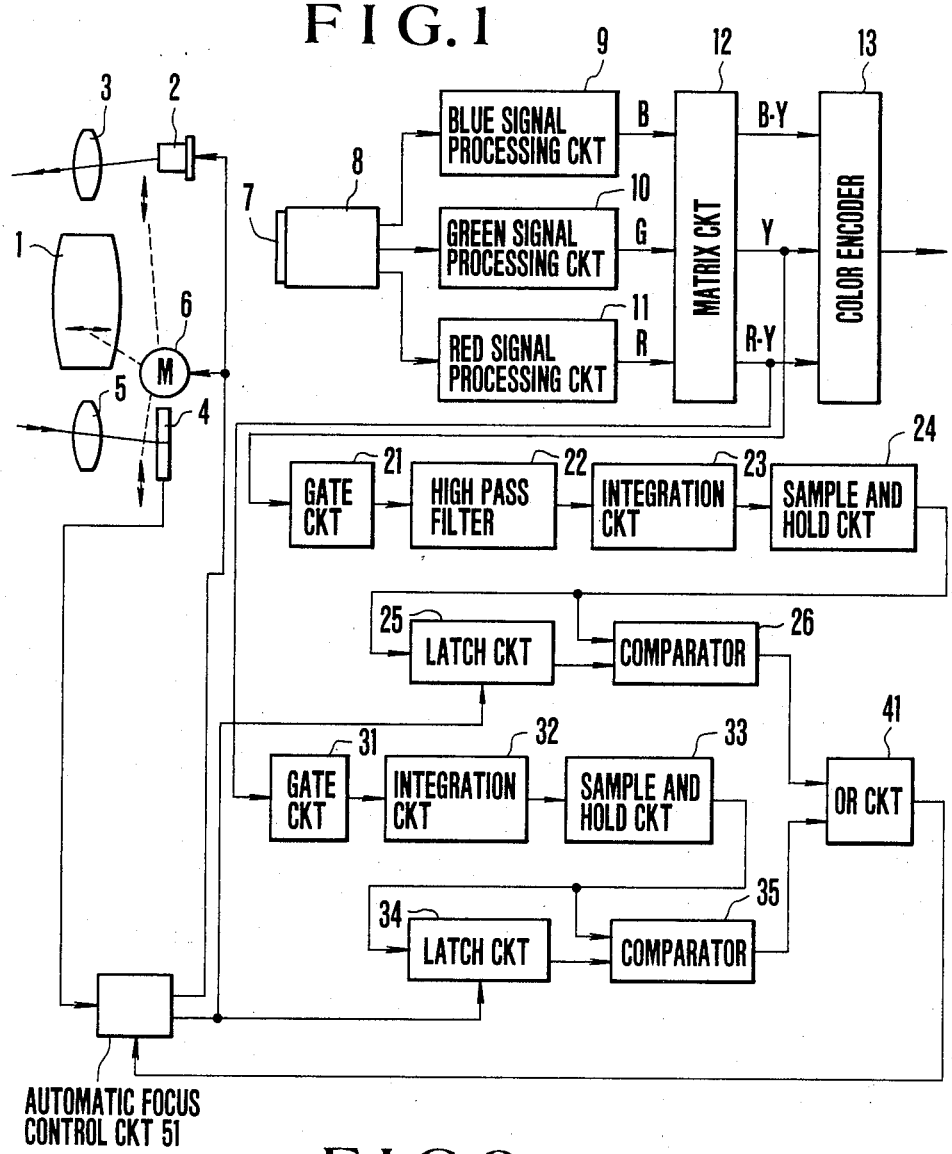
FIG. 1 is an electrical circuit diagram of an automatic focus adjusting device according to the invention.
Figure 2:
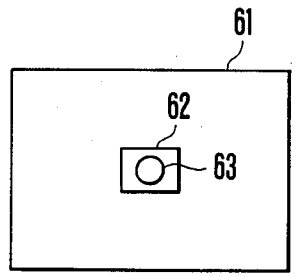
FIG. 2 is a plan view illustrating a finder portion of the device shown in FIG. 1.

The present invention is next described in connection with an embodiment thereof by reference to the drawings. FIG. 1 schematically illustrates an automatic focusing apparatus for a photographic lens 1 according to the invention, including a near infrared light-emitting diode 2, a projection lens 3, a light sensor 4 having two resolution cells, a collection lens 5, and an electric motor 6 as a drive source for automatic focus adjustment. Axially aligned with the lens 1 is a color filter 7 followed by a 3-electrode type single tube color camera 8 having blue, green and red signal processing circuits 9, 10 and 11 respectively, a matrix circuit 12, and a color encoder 13. A gate circuit 21, a high pass filter 22, an integration circuit 23, a sample and hold circuit 24, a latch circuit 25 and a comparator 26 constitute a first detecting circuit for detecting whether the object image is in focus or out of focus. A gate circuit 31, an integration circuit 32, a sample and hold circuit 33, a latch circuit 34 and a comparator 35 constitute a second detecting circuit for detecting whether the object is in motion. Element 41 is an OR circuit; and element 51 is an automatic focus control circuit. FIG. 2 illustrates the field of view 61 of a finder of the video camera equipped with the apparatus of FIG. 1 with a rectangular area 62 for detecting when the object image obtained from the video signal becomes out of focus, and a range finder spot 63 for the active type automatic focus apparatus.

The operation of the apparatus of such construction is as follows: The near infrared light-emitting diode 2 is lit, and a light spot is projected by the lens 3 onto an object (not shown) to be photographed. The reflection of this light spot is received by the lens 5 and its image is formed on the light sensor 4. As the photographic lens 1 moves axially, the diode 2 and the sensor 4 move laterally. A closed loop servo operates so that when in focus, the spot image takes its place at the center of the lateral length of the sensor 4. When the in-focus condition is established, the supply of electrical power to the near infrared light emitting diode 2 is then cut off. The foregoing operation of the active type focusing apparatus is controlled by the automatic focus control circuit 51. It is to be noted that the light projecting element and the light receiving element move simultaneously, and when in focus the range finding field is always positioned at the center of the area of the picture frame.

Meanwhile, the 3-electrode type single tube color camera 8 having blue, green and red vertical stripe filters 7 produce blue (B), green (G) and red (R) light signals at the outputs of the processing circuits 9, 10 and 11 respectively, which are converted by the matrix circuit 12 to B-Y, Y and R-Y signals, where Y is the brightness expressed as $Y = 0.11B + 0.59G + 0.3R$. These signals are combined by the color encoder 13 to produce the compound color video signals.

Meanwhile, the Y signal for the area 62 is taken out by the gate circuit 21 and, further, only its high frequency component is extracted by the high pass filter 22, whose output is shown in FIG. 3C. The signal for one field then integrated by the integration circuit 23 as shown in FIG. 3D, and held by the sample and hold circuit 24. Then, that data which is obtained when the photographic leans reaches the in-focus condition, is latched in the latch circuit 25 in response to a signal from the control circuit 51. FIGS. 3E and 3F show the output waveforms of the sample and hold circuit 24 and the latch circuit 25 respectively. This signal is compared with the data for the following field by the comparator 26. When the latter is larger, the image is judged to be out of focus, and the comparator 26 produces an output signal of high level. The output signal of the comparator of FIG. 3G is shown as low because the sample and hold output is higher than the latch output. Also, the aforesaid R-Y signal for the area 62 is taken out by the gate circuit 31, which has a similar function to that of the gate circuit 21, then integrated for one field by the integration circuit 32, and held by the sample and hold circuit 33. Then, that data which is obtained when the photographic lens reaches the in-focus condition is latched by the latch circuit 34 in response to the signal from the control circuit 51. FIGS. 3H to 3K show the output and input signals of such circuits respectively. This signal is compared with the data for the next field by the comparator 35. When the hue of the object has changed, the comparator 35 produces an output signal of high level as shown in FIG. 3L, judging that the object has moved. Thereby, when the high frequency component of the Y signal of the object decreases, or when the hue of the object has changed, the OR circuit 41 produces an output signal of high level which is applied to the control circuit 51, and the control circuit 51 causes current supply to the light emitting diode 2 to start again. Thus, the focus adjustment is recycled by the aforesaid active type focusing apparatus.

It is to be noted that when detecting a change in the signal by the comparator 26 or 35, the reference level may be taken as lower than the latch signal by a prescribed value, giving the advantage of heightening the electrical power saving effect and the stabilization of the operation.

Though the embodiment has been described taking an example of the 3-electrode type color camera as the color video camera, the present invention is, of course, not confined to this type, and may be applied to other types such as the frequency separation type, phase separation type, and the step energy type. Also, besides the single tube (single plate) as described above, the 3-tube (plate) type may be employed.

Further, as the elements for judging the in-focus/out-of-focus of the object, use may be made of other methods than that described above, or the method of utilizing the high frequency component. As as described in Japanese Patent Publication No. Sho 58-708, the control is made so that the absolute value of the difference between the timely delayed video signal and the not-delayed video signal, or the method of utilizing the time difference signal may be used. Another method is by making the control such that the differentiated value of the video signal becomes the maximum, as described in Japanese Laid-Open Patent Application No. Sho 47-37634. Another method is to utilize the difference signal between the adjacent resolution cells, as described in Japanese Laid-Open Patent Application No. Sho 56-62210.

Further, as the elements for detecting the motion and change of the object from the video signal, instead of that described above, or the method of utilizing the color difference signal such as R-Y signal or B-Y signal, it is also possible to use other various methods. For example, the video signals of the object are converted to the binary form, and the variation of this binary image with time is evaluated to detect the motion of the object. Another method is to utilize the primary or secondary differentiation of the video signal of the object in extracting the outline of the object. By evaluating the change of this outline, the motion of the object is detected.

As has been described above, according to the present invention, in the active type automatic focusing apparatus which when rendered operative projects a signal onto an object and senses the reflection of the signal from the object until an optical system is sharply focused, and which is rendered inoperative in automatic response to establishment of the in-focus condition of the optical system, use is made of a first detecting circuit for detecting when an image of the aforesaid object is taken out of focus by processing the video signals for the aforesaid object, and a second detecting circuit for detecting when the image of the aforesaid object changes its place by processing the video signals for the aforesaid object, whereby the initiation of an operation of the aforesaid active type automatic focusing apparatus is controlled by at least one of the outputs of said first and said second detecting circuits. Despite the fact that the consumption of electrical energy is limited to a minimum, therefore, the present invention makes it possible to assure that the focus adjusting operation is recycled each time the in-focus condition of the optical system is broken.

What is claimed is:

1. An automatic focus adjusting device comprising:
   (a) first detecting means for detecting that an image of an object has gone out of focus;
   (b) second detecting means for detecting that an image of an object has moved; and
   (c) signal producing means receptive of signals from said first and said second detecting means for producing a signal contributing to a focusing action.

2. An automatic focusing adjusting device according to claim 1, further comprising an active type automatic focus control circuit responsive to the output of said signal producing means to take a focusing action.

3. An automatic focus adjusting device comprising:
   (a) light emitting means for projecting light onto an object;
   (b) light receiving means for receiving the light reflected from the object and for producing a signal representing the light reflected from the object;
   (c) focusing control means for controlling a photographic lens so it achieves an in-focus position based on the signal produced by said light receiving means;
   (d) first signal output means for producing a signal representing that an image of the object is out of focus;
   (e) second signal output means for producing a signal representing that the image of the object has moved; and (f) means for producing an actuating signal for said focusing control means based on the signal from at least one of said first and second signal output means.

4. An automatic focus adjusting device comprising:
(a) light emitting means, light receiving means and a photographic lens;
(b) means for controlling said photographic lens so it achieves an in-focus position based on a signal from said light receiving means;
(c) means receptive of light passed through said photographic lens for producing video signals;
(d) first detecting means receptive of the video signals from said video signal producing means and responsive to detection of an image of an object being out of focus for producing an output signal;
(e) second detecting means receptive of the video signals from said video signal producing means and responsive to detection of the image of the object having moved for producing an output signal; and
(f) means for actuating said focusing control means in response to the output signals of said first and/or second detecting means.

* * * * *